US008246102B2

(12) United States Patent
Lange

(10) Patent No.: US 8,246,102 B2
(45) Date of Patent: Aug. 21, 2012

(54) WIDE OPENING VEHICLE DOOR WITH EASY-REACH FEATURE

(75) Inventor: Richard J. Lange, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 44 days.

(21) Appl. No.: 12/975,872

(22) Filed: Dec. 22, 2010

(65) Prior Publication Data

US 2011/0088214 A1 Apr. 21, 2011

Related U.S. Application Data

(62) Division of application No. 12/104,481, filed on Apr. 17, 2008, now abandoned.

(51) Int. Cl.
*B60J 5/00* (2006.01)

(52) U.S. Cl. .................................................... 296/146.4

(58) Field of Classification Search ............... 296/146.4, 296/146.1; 16/49, 51, 52, 56, 58, 71, 72, 16/77, 62, 66, 10, 9, 54, 82; 267/221, 120, 267/124; 188/284; 49/137, 28
See application file for complete search history.

(56) References Cited

U.S. PATENT DOCUMENTS

| | | | | |
|---|---|---|---|---|
| 3,708,826 | A | 1/1973 | Larson | |
| 4,004,662 | A | 1/1977 | Sorgatz et al. | |
| 4,102,006 | A | 7/1978 | Jenkins | |
| 4,139,182 | A | 2/1979 | Nagase et al. | |
| 4,240,619 | A | 12/1980 | Wirges et al. | |
| 4,544,144 | A | 10/1985 | Ishida et al. | |
| 4,596,383 | A | 6/1986 | Howard | |
| 4,689,849 | A | 9/1987 | Eger et al. | |
| 5,131,512 | A | 7/1992 | Steinhilber et al. | |
| 5,248,131 | A * | 9/1993 | Jobelius | 267/64.11 |
| 5,468,042 | A * | 11/1995 | Heinrichs et al. | 296/146.4 |
| 5,560,456 | A | 10/1996 | Koch et al. | |
| 6,129,343 | A * | 10/2000 | Ecarnot | 267/64.11 |
| 6,318,524 | B1 * | 11/2001 | Lutz et al. | 188/284 |
| 6,745,876 | B2 * | 6/2004 | Beck | 188/267.2 |
| 7,066,310 | B2 | 6/2006 | Mintgen et al. | |
| 7,261,286 | B2 * | 8/2007 | McConnell et al. | 267/195 |
| 7,866,452 | B2 * | 1/2011 | Brehm et al. | 188/284 |
| 8,127,901 | B1 * | 3/2012 | Lu | 188/322.15 |
| 2010/0123276 | A1 * | 5/2010 | Adoline | 267/69 |

* cited by examiner

*Primary Examiner* — Kiran B Patel

(57) ABSTRACT

A method of operating a door return device for a vehicle door having a travel path including an easy-reach position and a fully open position. A housing is coupled to one of the door or the door frame and has a chamber containing a working fluid. A link is coupled to the other one of the door or the door frame and is movable into and out of the housing in response to travel of the door. An end-damping piston slides in the chamber and includes a fluid passage between opposite sides. A return spring is disposed between the end-damping piston and one longitudinal end of the chamber. When the return spring is substantially unloaded then the end-damping piston is positioned relative to the one longitudinal end such that the door is away from the fully open position at least as far as the easy-reach position.

12 Claims, 3 Drawing Sheets

WIDE OPENING VEHICLE DOOR WITH EASY-REACH FEATURE

CROSS REFERENCE TO RELATED APPLICATIONS

This application claims the benefit of U.S. nonprovisional patent application Ser. No. 12/104,481, filed Apr. 17, 2008, which is incorporated herein by reference.

BACKGROUND OF INVENTION

The present invention relates generally to end-of-movement damping for doors of motor vehicles, and more specifically to a return device for assisting in the re-closing of a vehicle door after the opening motion has been damped.

Wide opening doors for motor vehicles (i.e., a door with a large range of movement to clear the door opening) have several advantages. From a consumer standpoint, a wider opening is beneficial when needing to load large items into the vehicle. From a manufacturer standpoint, since many assembly operations are performed after a door has been installed but with the door swung open to its maximum extent (e.g., connecting wiring or other components in the hinge area between the forward edge of the door and the door frame), these assembly operations become easier the greater the opening range of the door.

A disadvantage of a wide opening door becomes evident when a vehicle occupant attempts to close the door. After being seated inside the vehicle, the occupant may be at too great a distance from the door pull handle to be able to conveniently reach it. In addition, the door must initially be pulled in the radial direction (i.e., toward the back of the vehicle instead of toward the occupant). This results in a non-ergonomic motion being required of the seated occupant since the initial sideways movement has to be generated with the arm outstretched.

So that the manufacturing advantage of a wide opening door can be realized without creating customer inconvenience when closing the door, it is known to install door hinges with a wide range of motion to facilitate the necessary assembly operations. Once those operations are completed at the assembly plant, a door check link is connected between the door and door frame that thereafter restricts the range of door motion so that the vehicle occupant is better able to reach it for closing. However, it becomes more difficult to load large items through the door opening because of interference from the door.

Door check links have traditionally provided detents to preferentially hold an open door in various predetermined positions, including at the fully open position. More recently, door holding units have been introduced using hydraulic cylinders to provide positive retention of a manually positioned door at infinitely many positions across the full range of door motion. One example of such a door holding unit is the DORSTOP® device from Stabilus GmbH of Koblenz, Germany. As shown in U.S. Pat. No. 7,066,310, it is also known to provide damping (i.e., energy absorption) at the fully open end of the door travel using a separate end-damping piston that is acted upon by a main holding piston. In the prior art, even though a reset spring may be provided to reset the end-damping piston to its original position after being released by the holding piston, the door has been kept in its fully open position by the holding piston until the door is manually moved out of the open position by the user. In fact, the reset spring was intentionally designed not to induce any door motion since the device was meant to hold the door in any position in which is was placed by the user.

SUMMARY OF INVENTION

The present invention combines in a single device the end-damping of door motion with a slow, controlled partial return of the door from the fully open position to provide an easy-reach closing capability for a wide opening door.

In one aspect of the invention, a door return device is provided for a vehicle door having a travel path between a closed position in a door frame and a fully open position. The travel path includes an easy-reach position spaced by a predetermined distance from the fully open position. A housing is adapted to be coupled to one of the vehicle door or the door frame and has a chamber containing a working fluid. A link is adapted to be coupled to the other one of the vehicle door or the door frame and is movable into and out of the housing in response to travel of the vehicle door along the travel path. An end-damping piston is slidable in the chamber and is coupled to the link, wherein the end-damping piston partitions the chamber into first and second subchambers. The end-damping piston includes a surface for providing a fluid passage between the first and second subchambers. A return spring is disposed between the end-damping piston and one longitudinal end of the chamber. When the return spring is substantially unloaded, then, the end-damping piston is positioned relative to the one longitudinal end such that the vehicle door is away from the fully open position at least as far as the easy-reach position. Manual opening movement of the vehicle door into the fully open position is damped by flow of the working fluid through the fluid passage. Manual opening movement of the vehicle door into the fully open position loads the return spring. When the vehicle door is released at the fully open position it gradually moves to the easy-reach position by the unloading of the return spring, and the gradual closing movement of the vehicle door is damped by flow of the working fluid.

DETAILED DESCRIPTION

Figure 1:
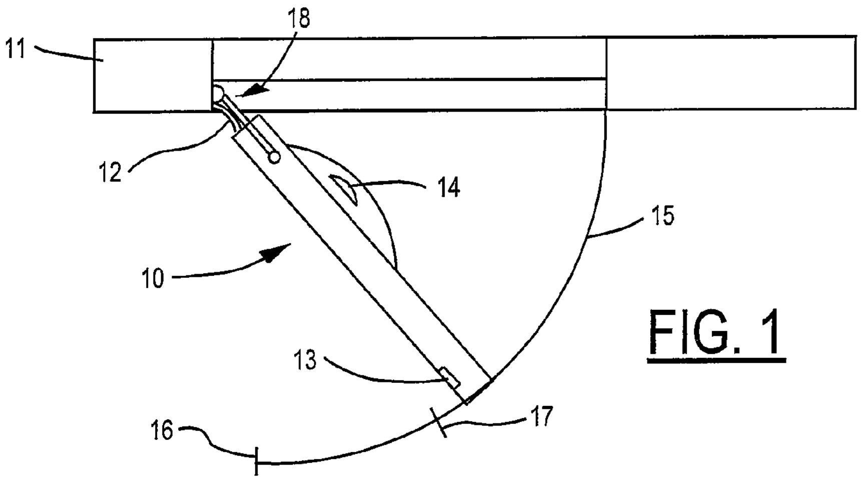
FIG. 1 is a diagram showing a range of motion for a vehicle door.

Referring to FIG. 1, a vehicle door 10 is attached to a door frame 11 by a hinge 12. Door 10 is normally opened using an outside door handle 13 and closed using an inside door handle 14. Of course, door 10 can also be moved by pushing on other portions thereof. Door 10 can be manipulated by a user (e.g., vehicle occupant) to swing through a range of motion according to an arc 15 with a fully open position 16 and an easy-reach position 17. A door hold & return device 18 is coupled between door 10 and frame 11 to provide a door holding function for any position between the door closed position and easy-reach position 17 where the user manually stops the door. An end-damping function is provided by device 18 between easy-reach position 17 and fully open position 16. When the user releases door 10 (i.e., stops applying opening force) in the range between positions 16 and 17, door 10 gradually returns to easy-reach position 17 by action of device 18 as will be described below. Device 18 is anchored to frame 11 at a position that does not coincide with the center axis of door rotation so that the greater the door opening angle the greater the extension of device 18. Thus, device 18 is contracted to its shortest length when door 10 is in its closed position and is extended to its maximum length when door 10 is in fully open position 16.

Figure 2:
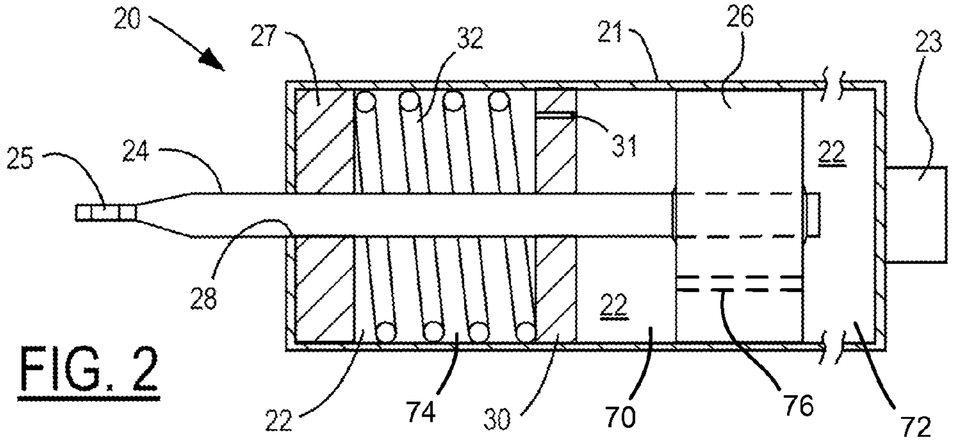
FIG. 2 is a cross-sectional view of a door return device in a position corresponding to the door being more closed than an easy-reach position.
Figure 3:
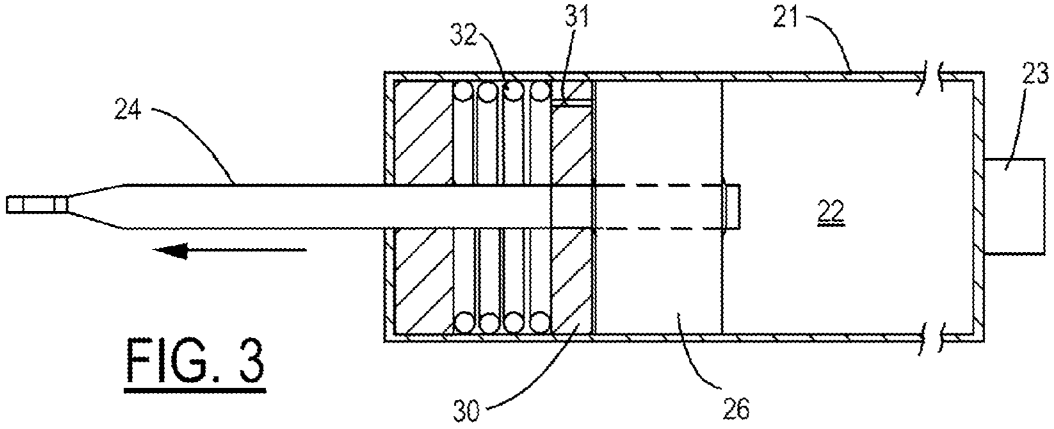
FIG. 3 is a cross-sectional view of a door return device in a position corresponding to the door being in its fully open position.
Figure 4:
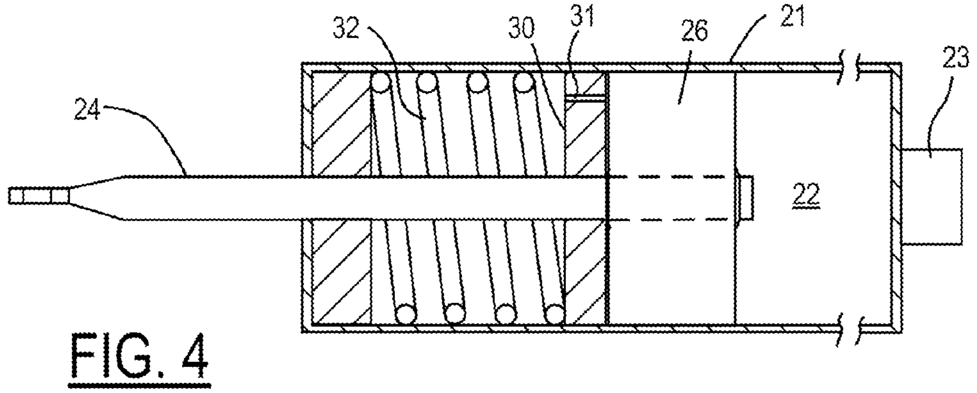
FIG. 4 is a cross-sectional view of a door return device in a position corresponding to the door being in the easy-reach position.

A first embodiment of a door holding and return device of the present invention is shown in FIGS. 2-4. Device 20 includes a housing 21 which may be preferably formed as a cylindrical shell having an interior space for containing various components and a working fluid 22 therein. For assembly purposes, housing 21 preferably comprises a plurality of sections that may be joined (e.g., welded) after installation of internal parts. A mounting block 23 is provided on housing 21 for mounting to one or the other of the door and the door frame. In a typical vehicle application, housing 21 may be mounted to an interior wall of a door shell. A link 24 extending from housing 21 has a mounting section 25 for mounting to the other of the door or door frame in a conventional manner. Within the inside of housing 21, link 24 is fixedly connected with a hold piston 26 so that piston 26 and link 24 are jointly slidable within the interior chamber of housing 21. A seal/guide 27 is mounted to one longitudinal end of housing 21 to slidingly accept link 24 so that working fluid 22 is not lost through a hole 28 where link 24 exits housing 21. Hold piston 26 includes various valve structures (fluid passage(s)) 76 for allowing working fluid 22 to pass through piston 26 when link 24 is forcibly moved in the longitudinal direction. The work required to force working fluid 22 through the valves and passages 76 within hold piston 26 are what hold the door connected to link 24 at any desired position in the absence of a sufficiently large push against the door. The hold piston 26 partitions the chamber into a first sub-chamber 70, to the left of the hold piston 26 as seen in FIG. 2, and a second sub-chamber 72, to the right of the hold piston 26 as seen in FIG. 2.

In order to provide end damping, an end-damping piston 30 is slidably retained on link 24 between hold piston 26 and longitudinal end seal 27. An orifice or passage way 31 (which may include an internal valve if desired) is provided in end-damping piston 30 to allow working fluid 22 to flow between opposite sides of end-damping piston 30 when it is forced to move. A return spring 32 is disposed between end-damping piston 30 and longitudinal end seal 27.

As shown in FIG. 2, return spring 32 is substantially unloaded (i.e., spring 32 is a compression spring with no compression forces being applied to it), and hold piston 26 is spaced from end-damping piston 30 such that the door is at a position somewhere between the closed position and the easy-reach position. Thus, hold piston 26 moves through fluid 22 in a conventional manner to provide infinitely many holding positions of the door across its movement range up to the easy-reach position. As the door is increasingly opened, hold piston 26 eventually contacts end-damping piston 30 at the moment the door enters the easy-reach position. When link 24 continues to move to the left as shown in FIG. 3 as a result of the user opening the door past the easy-reach position, end-damping piston 30 moves in the same direction to compress spring 32. As end-damping piston 30 moves through working fluid 22, movement is damped because of the restricted flow provided by passageway 31. The compression of return spring 32 provides additional damping or energy absorption as the door moves to the full open position, but the damping is primarily provided by the manipulation of working fluid 22 through passage 31. By damping the opening energy of the door, there is less chance of the door bouncing back from the open position.

When the operator eventually releases the door (e.g., after a large load has been successfully placed into the vehicle through the fully opened door), return spring 32 will have been compressed at least to some proportion of its maximum compression. In all previously known hold open devices, the hold piston would maintain its position at the fully open position and all other positions without being influenced by the return spring. In the present invention, however, return spring 32 provides a sufficient spring force to move end-damping piston 30, link 24, and hold piston 26 to the right until the easy-reach position is obtained as shown in FIG. 4. It should be noted that the end-damping and return function shown in FIGS. 2-4 can be provided by devices either with or without including the holding function at positions more closed than the easy-reach position. Thus, end-damping piston 30 partitions the chamber of working fluid into the first sub-chamber 70, to the right of the end damping piston 30 as seen in FIG. 2, and a third sub-chamber 74, to the left of the end damping piston 30 as seen in FIG. 2, wherein the inner surface of passage-way 31 provides a fluid passage between the first and third sub-chambers 70, 74.

Figure 5:
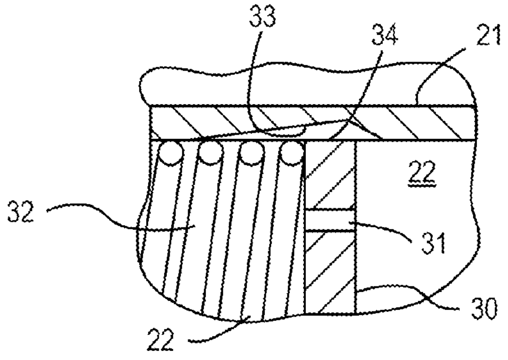
FIG. 5 is a longitudinal cross section showing a tapered groove for controlling fluid flow around the end-damping piston.

The present invention can be adapted to provide variable damping at different positions of the end-damping piston in order to achieve better energy absorption during full open and a more uniform return speed for the easy-reach function. As shown in FIG. 5, a tapered groove 33 is provided along the interior surface of housing 21 in the region traversed by piston 30 during the end-damping function. Tapered groove 33 has a variable cross-sectional area and provides an alternative flow path for working fluid 22 around an outer circumferential surface 34 of piston 30. The taper of groove 33 causes the cross-sectional area available for flow of working fluid 22 to be reduced as piston 30 moves closer to the end of housing 21 (i.e., toward the fully open position). Thus, the amount of damping varies with changing position of piston 30 to provide an increased braking force as the door approaches the full-open position to thereby create a smoother stop to the door movement. Conversely, when the door is released and the automatic return to the easy-reach position is executing, return spring 32 provides progressively less return force the closer it gets to its unloaded position. Since groove 33 provides a progressively larger cross section for flow of working fluid 22, spring 32 can maintain a more constant speed through the entire range of movement up to the easy-reach position.

Figure 6:
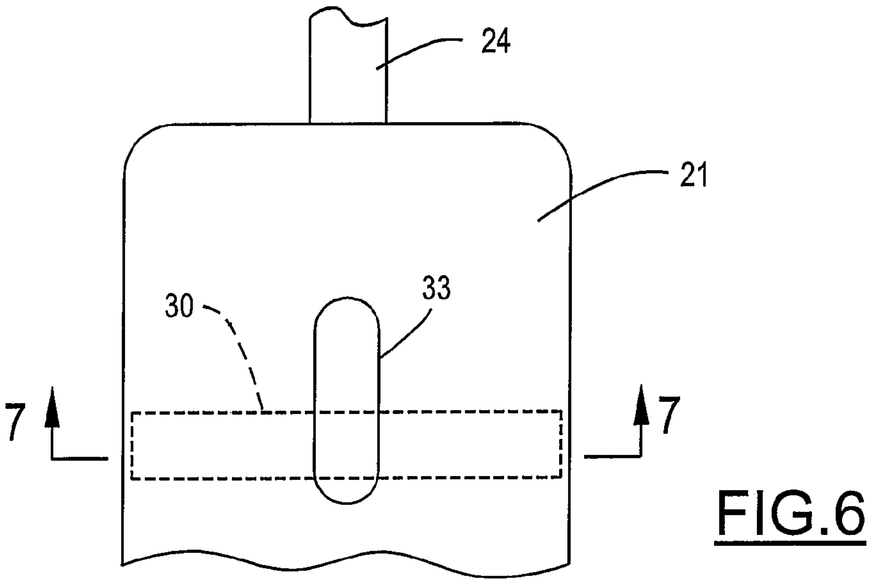
FIG. 6 is a top, exterior view of the housing with the tapered groove.
Figure 7:
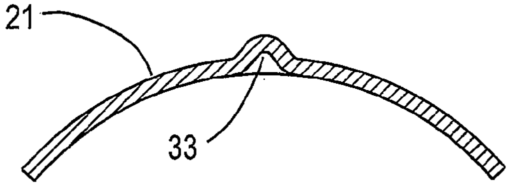
FIG. 7 is a cross section taken along line 7-7 of FIG. 6.

As shown in FIGS. 6 and 7, tapered groove 33 may preferably be obtained using a metal rolling process. Alternatively, cutting or drilling operations can be used to form the taper groove from the inside of housing 21. Tapered groove 33 can be used with or without passage 31 in end-damping piston 30. In a preferred embodiment, the average cross-sectional area of tapered groove 33 is approximately equal to the flow cross-sectional area of passageway 31. The tapered profile of groove 33 can also be adapted to provide return speed profiles other than a substantially uniform speed, if desired.

Figure 8:
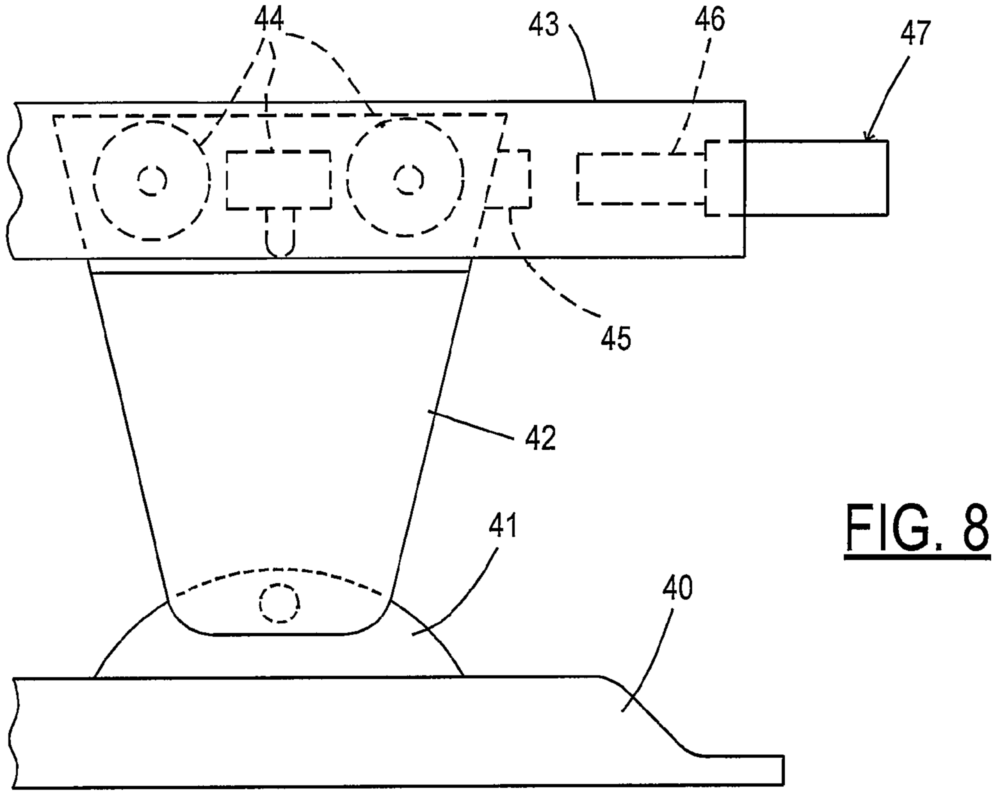
FIG. 8 is a top view showing an alternative embodiment of a door return device for a sliding door.

The present invention can also be utilized in conjunction with a sliding door in order to provide end-damping and easy-reach return functions without any hold function. As shown in FIG. 8, a sliding door 40 has a door bracket 41 pivotably connected with a roller bracket 42 that traverses a roller track 43 mounted along a side of the vehicle. Sliding vehicle doors typically employ three different sets of roller bracket/roller tracks with upper and lower roller brackets attached to the front edge of the sliding door and a center roller bracket connected to the rear edge of the sliding door. A set of rollers 44 on roller bracket 42 support door 40 and traverse roller track 43 between the closed position and a fully open position. The present invention can be utilized to provide end-damping and an easy-reach return function as follows. A bumper 45 carried by roller bracket 42 contacts a bumper link 46 of a return device 47 mounted at the end of track 43. When bumper 45 contacts bumper link 46, door 40 may be further pushed so that bumper link 46 is retracted within device 47 until sliding door 40 reaches its fully open position. Device 47 provides damping and energy absorption to slow the travel of sliding door 40 as previously described. In order to assist vehicle occupants in the effort to reach sliding door 40 in order to close it after having entered the vehicle, bumper link 46 returns to its extended or easy-reach position thereby moving sliding door 40 in the closing direction in a slow, controlled manner.

Figure 9:
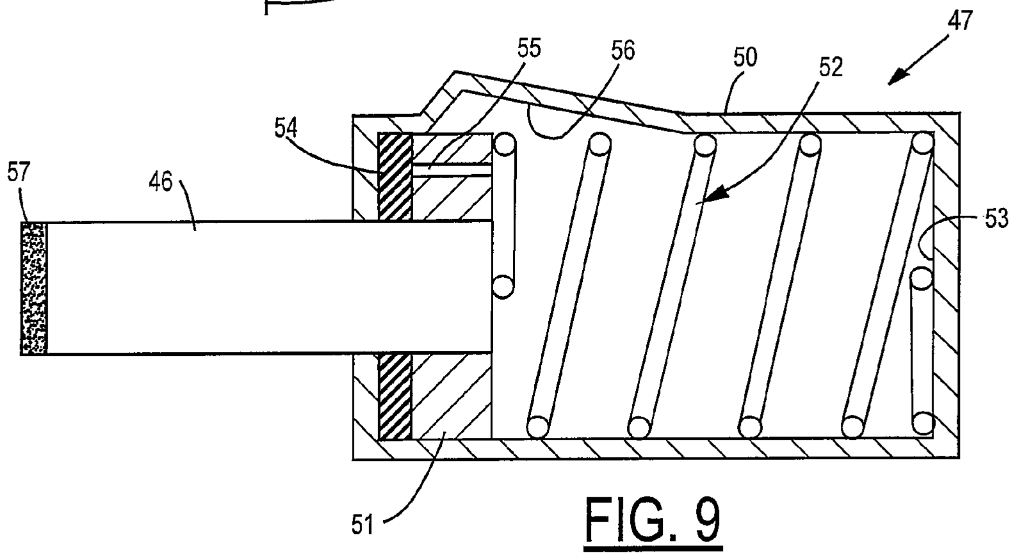
FIG. 9 is a cross section of a door return device adapted for the embodiment of FIG. 8.

A first embodiment of door return device 47 for providing end-damping and easy-reach automatic return without permanent connection to the door is shown in FIG. 9. A housing 50 contains a working fluid and an end-damping piston 51. A return spring 52 is shown as a compression spring which is located between piston 51 and a back longitudinal wall 53 of housing 50. An end-seal 54 receives link 46 to maintain alignment of link 46 and to prevent escape of the working fluid. Damping is controlled by a passage 55 through piston 51 and/or a tapered groove 56 in housing 50 as previously described. A soft, rubber bumper 57 may be mounted to the end of link 46 to avoid any displeasing sound or shock when impacting the roller bracket. Since return spring 52 acts as a compression spring, it can be placed between piston 51 and end wall 53 without needing any fastening connections.

Figure 10:
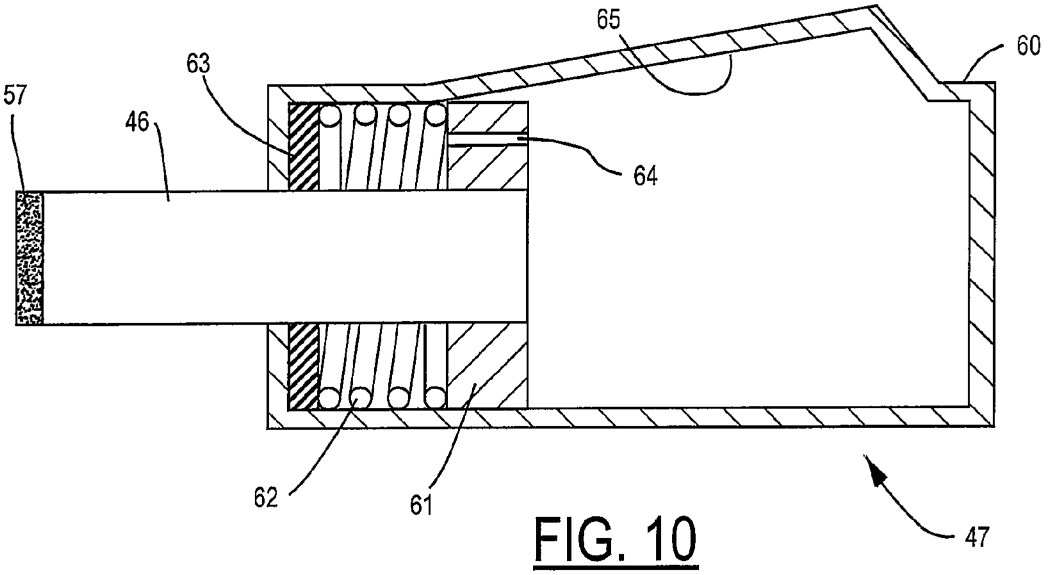
FIG. 10 is a cross section of an alternative door return device adapted for the embodiment of FIG. 8.

An alternative embodiment shown in FIG. 10 utilizes an extension spring. Thus, housing 60 receives an end-damping piston 61 fixably mounted to link 46. Extension spring 62 is fixably connected to piston 61 at one end and at its other end to an anchor point proximate an end seal 63. The connection can be provided by an adhesive applied to end seal 63, or spring 62 can be joined to housing 60 using an adhesive or other mechanical mounting. Damping during the retraction of link 46 into housing 60 is provided by a passage 64 in piston 61 and/or a tapered groove 65. The energy absorption is also supplemented by extension of spring 62. When the door is released and no longer forced against link 46, extension spring 62 returns to its unloaded state shown in FIG. 10 to push the door back to its easy-reach position.

While certain embodiments of the present invention have been described in detail, those familiar with the art to which this invention relates will recognize various alternative designs and embodiments for practicing the invention as defined by the following claims.

What is claimed is:

1. A method of operating a door return device for a vehicle door having a travel path wherein the door pivots between a closed position in a door frame, a fully open position, and an easy-reach position between the closed position and the fully open position and spaced a predetermined distance from the fully open position, the door return device including a housing coupled to one of the vehicle door and the door frame and including a working fluid, and a link coupled to the other of the door and the door frame and movable into and out of the housing, the method comprising the steps of:

(a) damping an opening movement of the door between the closed position and the easy-reach position by directing fluid from a first sub-chamber on a first side of a hold piston slidably mounted in the housing to a second sub-chamber on an opposed, second side of the hold piston through a first fluid passage extending between the first sub-chamber and the second sub-chamber;

(b) damping an opening movement of the door between the easy-reach position and the fully open position by directing fluid from the first sub-chamber on the first side of the hold piston to the second sub-chamber on the second side of the hold piston, by directing fluid from a third sub-chamber on a first side of an end damping piston slidably mounted in the housing to the first sub-chamber on an opposed, second side of the damping piston through a second fluid passage allowing fluid to flow between the third sub-chamber and the second sub-chamber, and by deforming a spring; and (c) automatically moving the door in a closing direction between the fully open position and the easy-reach position by the spring imparting a force on and moving the end damping piston and the hold piston until the door is in the easy-reach position.

2. The method of claim 1 wherein step (c) is further defined by fluid flowing from the second sub-chamber into the first sub-chamber and fluid flowing from the first sub-chamber into the third sub-chamber as the spring moves the end damping piston and the hold piston.

3. The method of claim 1 wherein step (b) is further defined by the hold piston being slidably fixed to the link and the end dampening piston being slidable along the link, and wherein the hold piston moves the end damping piston by exerting a force on the end damping piston as the door moves from the easy-reach position to the fully open position.

4. The method of claim 3 wherein step (b) is further defined by the spring being compressed by the end damping piston exerting a force on the spring as the door moves from the easy-reach position to the fully open position.

5. The method of claim 1 including step (d) automatically holding the door in a partially open position between the closed position and the easy-reach position when a force applied for opening or closing the door ceases while the door is in the partially open position.

6. The method of claim 1 wherein step (b) is further defined by the spring being a coil spring that is compressed by the end damping piston pushing against the spring as the door moves from the easy-reach position to the fully open position.

7. The method of claim 1 wherein step (a) is further defined by the hold piston being spaced from the end damping piston when the door is between the closed position and the easy-reach position.

8. The method of claim 1 wherein step (c) is further defined by the second fluid passage providing for a variable area of fluid flow as the spring moves the end damping piston while the door is automatically moving in the closing direction between the fully open position and the easy-reach position.

9. The method of claim 8 wherein step (c) is further defined by the second fluid passage being configured with the variable area of flow shaped such that an approximately uniform return speed of the door is achieved as the door automatically moves from the fully open position to the easy-reach position under the force of the spring.

10. The method of claim 8 wherein step (b) is further defined by a third fluid passage extending through the end damping piston directing fluid flow from the third sub-chamber to the first sub-chamber.

11. The method of claim 10 wherein step (b) is further defined by the second fluid passage being a tapered groove recessed in a wall of the housing and directing fluid flow from the third sub-chamber to the first sub-chamber around a periphery of the end damping piston to provide for the variable area of the fluid flow.

12. The method of claim 1 wherein step (b) is further defined by the second fluid passage extending through the end damping piston and directing fluid flow from the third sub-chamber to the first sub-chamber.

* * * * *